(12) United States Patent
Youssef et al.

(10) Patent No.: US 9,556,780 B2
(45) Date of Patent: Jan. 31, 2017

(54) METHOD FOR DIAGNOSING A PARTICLE FILTER BY MEANS OF A SOOT CAPTURING DEVICE

(71) Applicants: IFP ENERGIES NOUVELLES, Rueil-Malmaison (FR); ELECTRICFIL AUTOMOTIVE, Zi Ouest-Miribel (FR)

(72) Inventors: Bilal Youssef, Villeurbanne (FR); Yann Creff, Les Cotes d'arey (FR)

(73) Assignees: IFP ENERGIES NOUVELLES, Rueil-Malmaison (FR); ELECTRICFIL AUTOMOTIVE, Zi Quest-Miribel (FR)

( * ) Notice: Subject to any disclaimer, the term of this patent is extended or adjusted under 35 U.S.C. 154(b) by 0 days.

(21) Appl. No.: 14/763,641

(22) PCT Filed: Jan. 16, 2014

(86) PCT No.: PCT/FR2014/050081
§ 371 (c)(1),
(2) Date: Jul. 27, 2015

(87) PCT Pub. No.: WO2014/118452
PCT Pub. Date: Aug. 7, 2014

(65) Prior Publication Data
US 2015/0361859 A1 Dec. 17, 2015

(30) Foreign Application Priority Data
Jan. 29, 2013 (FR) ...................................... 13 00184

(51) Int. Cl.
*F01N 11/00* (2006.01)
*F01N 3/021* (2006.01)

(52) U.S. Cl.
CPC ............... *F01N 11/00* (2013.01); *F01N 3/021* (2013.01); *F01N 2550/04* (2013.01);
(Continued)

(58) Field of Classification Search
CPC .................................. F01N 11/00; F01N 3/021
See application file for complete search history.

(56) References Cited

U.S. PATENT DOCUMENTS 8,839,610 B2* 9/2014 Aoki ....................... F01N 3/023
60/295
9,134,216 B2* 9/2015 Hedayat ............. G01N 15/0656
(Continued)

FOREIGN PATENT DOCUMENTS

JP 2007315275 A 12/2007
WO 2011135718 A1 11/2011

OTHER PUBLICATIONS

International Search Report for International Application No. PCT/FR2014/050081 dated Mar. 19 2014, English language.

*Primary Examiner* — Calvin Cheung
(74) *Attorney, Agent, or Firm* — Fitch, Even, Tabin & Flannery LLP

(57) ABSTRACT

The invention relates to a method for diagnosing a particulate filter by means of a soot sensor, the method being based on the direct analysis of the temporal signal supplied by the soot sensor (CAP) and the use of the available quantities (PAR) in the control unit of the heat engine. These data allow for a classification (CLA) of an indicator correlated to the cumulative quantity of soot (RES) in a multidimensional space (GRA). Based on the classification (CLA), the existence of a failure of the particulate filter is determined.

10 Claims, 4 Drawing Sheets

(52) U.S. Cl.
  CPC .. *F01N 2560/05* (2013.01); *F01N 2900/0418* (2013.01); *F01N 2900/08* (2013.01); *F01N 2900/1606* (2013.01); *Y02T 10/47* (2013.01)

(56) References Cited

U.S. PATENT DOCUMENTS

| | | | | |
|---|---|---|---|---|
| 9,333,512 | B2* | 5/2016 | Mainelis | B03C 3/47 |
| 2005/0252199 | A1* | 11/2005 | Arlt | F01N 9/002 |
| | | | | 60/285 |
| 2006/0070361 | A1* | 4/2006 | Sellers | B01D 46/0064 |
| | | | | 55/303 |
| 2008/0092742 | A1* | 4/2008 | Marra | B60H 3/0085 |
| | | | | 96/16 |
| 2009/0188242 | A1* | 7/2009 | Williams | F01N 3/023 |
| | | | | 60/295 |
| 2009/0266058 | A1* | 10/2009 | Kesse | F01N 3/106 |
| | | | | 60/295 |
| 2010/0037684 | A1* | 2/2010 | Harshbarger | F01N 3/021 |
| | | | | 73/114.76 |
| 2010/0043527 | A1* | 2/2010 | Marra | B60H 1/008 |
| | | | | 73/28.02 |
| 2010/0180669 | A1 | 7/2010 | Baars et al. | |
| 2011/0265456 | A1* | 11/2011 | Fiveland | F01L 1/146 |
| | | | | 60/285 |
| 2012/0011829 | A1* | 1/2012 | Taibi | F01N 3/103 |
| | | | | 60/274 |
| 2012/0102924 | A1* | 5/2012 | Ante | F01N 9/002 |
| | | | | 60/274 |
| 2013/0000601 | A1* | 1/2013 | VanDerWege | F02D 41/06 |
| | | | | 123/435 |
| 2013/0104529 | A1* | 5/2013 | Takayanagi | F01N 3/035 |
| | | | | 60/297 |
| 2014/0230412 | A1* | 8/2014 | Singh | F01N 9/002 |
| | | | | 60/274 |
| 2014/0322091 | A1* | 10/2014 | Wahlstrom | F01N 3/0233 |
| | | | | 422/180 |
| 2014/0331654 | A1* | 11/2014 | Swoish | F01N 9/005 |
| | | | | 60/295 |
| 2016/0123259 | A1* | 5/2016 | Schaffner | F02D 41/029 |
| | | | | 60/274 |

* cited by examiner

METHOD FOR DIAGNOSING A PARTICLE FILTER BY MEANS OF A SOOT CAPTURING DEVICE

The present invention relates to the field of the reducing of the pollution generated by diesel engines by means of particulate filters.

These days, regulatory constraints on polluting emissions are increasingly stringent for diesel vehicles, notably with regard to the particulate emissions. Despite significant advantages in this area, notably via the development of the particulate filters, concerns remain regarding these emissions, in particular for the embedded diagnosis throughout the life of a vehicle. In effect, with time, the particulate filter may not correctly fulfill its function as a result of various types of failures, resulting in a violation of the emissions limit threshold. In this case, an alarm signal supplied by a diagnostic algorithm must be generated, indicating the need to change the failing filter.

The diagnostic methods currently based on measuring the loss of charge at the terminals of the particulate filter will not be able to meet the future standards, which will be increasingly restrictive (the limit threshold for emissions is constantly being reduced). To meet the future standards, a soot sensor placed downstream of the particulate filter becomes essential for most diesel vehicles.

Other diagnostic methods are based on the use of estimators and models, which demand a lot of calibrations, which takes a lot of time and has a significant cost. Furthermore, the diagnostic methods with models exhibit significant dispersion sources. Moreover, the patent application US 2010/0180669 A1 describes another particulate filter diagnostic method that does not use a model. For this method, a failure is diagnosed on the basis of a comparison of a value that is a function of characteristic quantities of the operation of the engine with a first threshold and on a comparison of a soot sensor signal with a second adaptable threshold. The comparison with two thresholds (including one adaptable threshold) makes this method complicated.

To resolve these problems, the invention relates to a method for diagnosing a particulate filter by means of a soot sensor, the method being based on the direct analysis of the temporal signal supplied by the soot sensor and the use of the available quantities in the control unit of the heat engine. These data allow for a classification of an indicator correlated to the cumulative quantity of soot (residue) in a multidimensional space. Based on the classification, the existence of a failure of the particulate filter is determined. Thus, the method allows for a diagnosis that is robust, simple to implement and to calibrate.

The Method According to the Invention

The invention relates to a method for diagnosing a particulate filter incorporated in an exhaust circuit of a heat engine, in which a signal is acquired from a soot sensor arranged downstream of said particulate filter, said signal from the sensor being made up of a plurality of charging times of said soot sensor corresponding to the soot build-up time until the regeneration of said soot sensor, characterized in that:

a multidimensional space is constructed of which one dimension corresponds to an indicator determined by means of said sensor signal and of which the other dimensions correspond to at least one parameter linked to the operating conditions of said engine;

then, at each end of charging of said soot sensor:

a value of said indicator is determined by means of said signal from the sensor;

the values of said parameters are determined;

the position of a point in said multidimensional space is determined by means of the values of said indicator and of said parameters; and the diagnosis of the state of said particulate filter is produced as a function of the position of said point in said multidimensional space.

According to the invention, from learning data, at least one first zone is defined comprising only points corresponding to a failure of said particulate filter, and a second zone is defined comprising only points corresponding to a nominal operation of said particulate filter, and the diagnosis of said particulate filter is produced as a function of the position of said point relative to said zones.

Preferably, a failure of said particulate filter is diagnosed if said point belongs to said first zone.

Advantageously, in said multidimensional space, a third zone is defined that is distinct from said first and second zones, said third zone comprising points corresponding to a nominal operation of said particulate filter and points corresponding to a failure of said particulate filter, for a point situated in said third zone, a failure of said particulate filter is diagnosed if the difference between the number of points corresponding to a failure and the number of points corresponding to a nominal operation arranged at a distance less than $R_v$ from said point to be analyzed is greater than a predetermined threshold $S_v$.

Advantageously, the user and/or the control unit of said engine are alerted if at least one failure of said particulate filter is diagnosed.

According to one embodiment of the invention, said indicator corresponds to the charging time of said signal from said soot sensor or to the integral, the average value, the average slope of said signal from the soot sensor during said charging time.

Advantageously, said parameters are a function of the quantities measured for the control of said engine.

Preferably, said measured quantities are chosen from the torque demand, the engine speed, the air flow rate, the intake pressure and the exhaust pressure.

According to one embodiment of the invention, the multidimensional space is three-dimensional and the parameters are the integrals of the torque demand and of the speed of said engine.

Furthermore, said particulate filter can be changed if at least one failure of said particulate filter is diagnosed.

BRIEF DESCRIPTION OF THE FIGURES

Other features and advantages of the method according to the invention will become apparent on reading the following description of nonlimiting exemplary embodiments, referring to the figures attached and described hereinbelow.

DETAILED DESCRIPTION OF THE INVENTION

The invention relates to a method for diagnosing a particulate filter incorporated in an exhaust circuit of a diesel engine. For this method, a soot sensor is arranged downstream of the particulate filter in the direction of circulation of the exhaust gases. This soot sensor generates an electrical signal representative of the quantity of particulates (soot) in the exhaust gases.

Failure is said to occur when the particulate filter no longer correctly fulfills its function, which generates a violation of the emissions limit threshold. This failure can be linked to a clogging of the filter. In this case, the failing filter must be changed.

The diagnosis corresponds to the study of the state of the particulate filter, and through this diagnosis, whether it is failing or whether it is operating optimally is notably verified.

Figure 1:
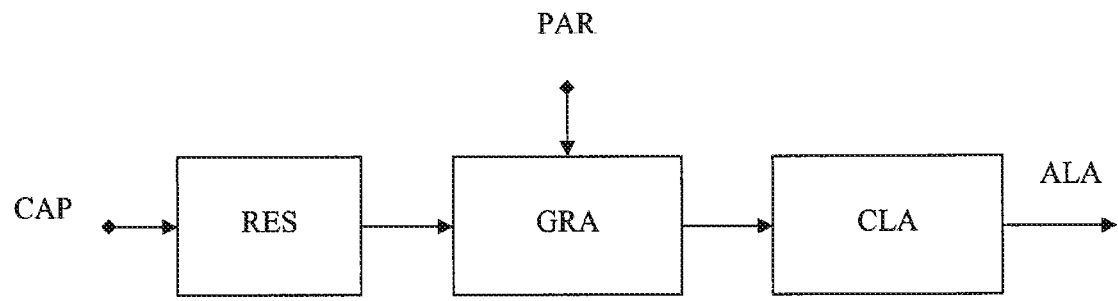
FIG. 1 illustrates the different steps of the method according to the invention.

FIG. 1 shows a general diagram of the diagnostic method illustrating the different steps necessary to diagnose a failure of the particulate filter from the signal from the soot sensor (CAP) and from parameters (PAR), also called operating conditions, defined from measured quantities. In a first step, an indicator called residue (RES) dependent on the state of the filter is generated from the sensor signal (CAP). Then, the generated residue is projected into a multidimensional reference frame linked to the operating conditions (GRA), for example 2D or 3D. The last step consists in diagnosing the state of the particulate filter by means of a classification (CLA). Optionally, an alarm signal (ALA) can be generated if at least one failure of the particulate filter is detected. The method according to the invention is simple to implement and has the advantage of using neither soot estimator at the output of the engine, nor models of components (sensor and filter).

In order to implement the steps described above, the following two operations can be performed first:
construction of a multidimensional space, and
definition of zones in the multidimensional space.
Construction of the Multidimensional Space For the representation (which may be graphic) (GRA), a multidimensional space is defined into which the measured data are projected: an indicator (also called residue) correlated to the quantity of soot and to at least one parameter. The multidimensional space is by definition at least two-dimensional.

Figure 2:
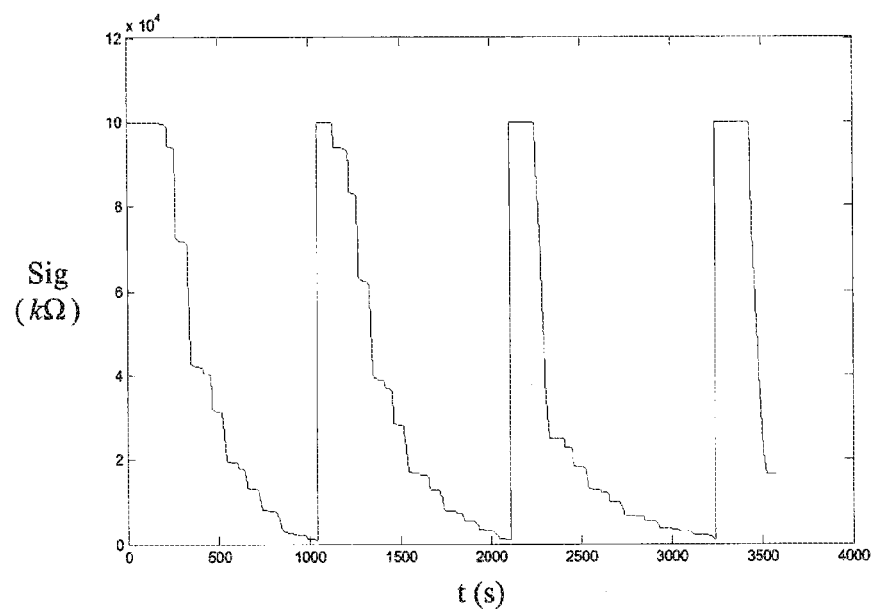
FIG. 2 represents an example of a simulated signal emitted by a soot sensor.

The soot sensor placed downstream of the particulate filter supplies a resistive signal $S_r$ which is a function of the accumulated soot. In the absence of collected soot, the sensor signal corresponds to a maximum value $S_r^{max}$. When the signal supplied reaches a minimum threshold $S_r^{min}$ corresponding to a maximum accumulation of soot, a regeneration of the sensor is forced, which returns the signal supplied to its maximum value $S_r^{max}$. An example of the sensor signal is illustrated in FIG. 2. In this FIG. 2, the signal (Sig in kΩ) has been represented as a function of time (t in s). The time during which the sensor signal changes from its maximum value to its minimum value is called charging time $T_c$.

A residue R (or fault indicator) is computed from the soot sensor signal during the charging time. The computed residue can correspond to the charging time or to a function of the data from the soot sensor during the charging time such as the integral, the average value, the average slope of this signal. The residue is therefore correlated with the quantity of particles downstream of the particulate filter. Notably, a low charging time reflects a significant quantity of particulates.

The parameters are functions of quantities measured (operating conditions) for the control of the engine. These parameters define operating conditions for the different running cycles. They can be, for example, the torque demand, the engine speed, the air flow rate, the intake pressure, the exhaust pressure or any other quantity available in the control unit. The functions implemented for the computation of the parameters can be the average value or the integral of the quantity measured for the duration of the signal from the soot sensor, that is to say during the charging time of the soot sensor.

According to one embodiment of the invention, the multidimensional space is three-dimensional and the parameters are the integrals of the torque demand and of the engine speed.

A multidimensional space is therefore constructed, for which one axis of the reference frame corresponds to the residue generated from the signal from the sensor, the other axes corresponding to the parameters (that is to say functions of the measured quantities).

Definition of the Zones

In this multidimensional space, at least two zones are defined: a first zone (Z1) called failure zone, and a second zone (Z2) called nominal zone.

These two discriminable zones Z1 and Z2 are defined in such a way that there are only nominal points in Z2 and only failing points in Z1. A criterion of belonging to these discriminable zones can be defined as, for example, the position relative to thresholds of coordinates setting the limits of each zone, through the definition of a hyper plan (for example a three-dimensional plan) or through other coordinate constraints. This criterion of belonging can be defined by an optimization algorithm, or manually, such that the zone Z1 comprises only failing points and the zone Z2 comprises only nominal points.

These two zones can be constructed from learning data containing the sensor signal and the parameters defining the operating conditions for different rolling cycles repeated in different conditions (outside temperature and pressure, altitude, etc.). The nominal zone corresponds to data obtained with a filter considered as nominal (for example, a leak below the type approval threshold defined by the standard) and the failing class corresponds to data obtained with a filter considered as failing (for example a leak (filter) close to or above the diagnostic threshold defined by the standard).

According to one embodiment of the method according to the invention, it is also possible to define a third zone (Z3) called zone of ambiguity. The third zone Z3 comprises the points not forming part of the discriminable zones. This third zone therefore comprises both points corresponding to a nominal operation of the particulate filter and points corresponding to a failure thereof. The data of these two sets can possibly be processed in order to reduce the number of points used by the diagnostic algorithm.

Figure 3:
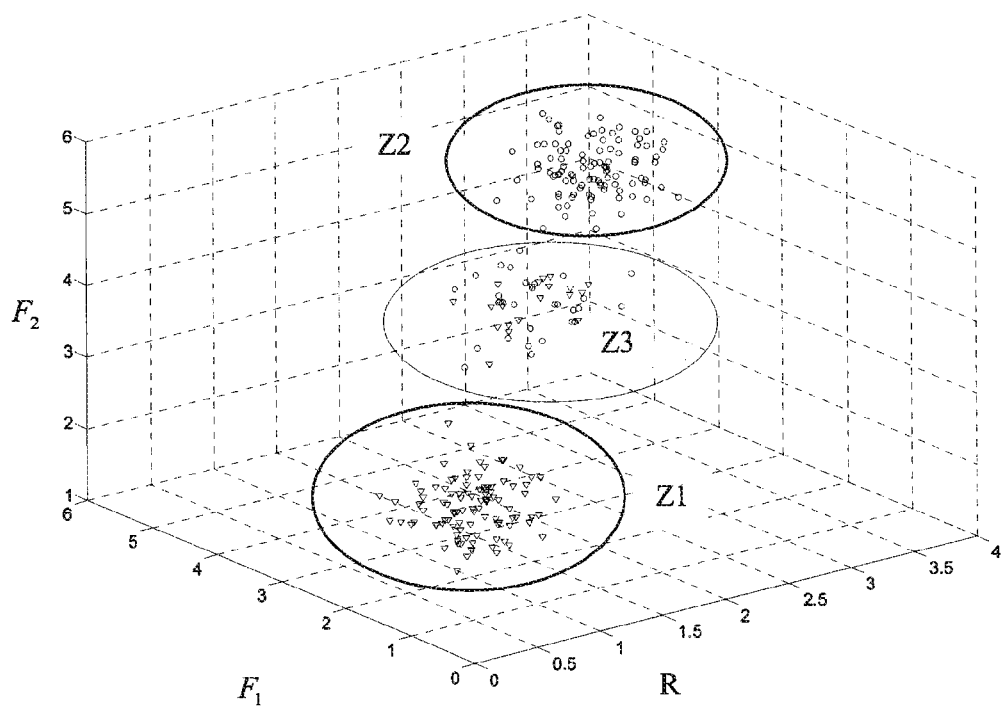
FIG. 3 is a 3D representation of the classification in three zones according to one embodiment of the invention.

FIG. 3 represents an example of three-dimensional space in which three zones have been represented. The axes of this graph correspond to the residue (R), and to two parameters ($F_1$, $F_2$) linked to the quantities measured. In this graph, and for the subsequent figures, the points corresponding to the nominal operation are represented by circles, and the points corresponding to failures are represented by triangles. It will be noted that the three zones are clearly separate, that the first zone (Z1) comprises only failing points, that the second zone (Z2) comprises only nominal points, and that the third zone (Z3) comprises both failing points and nominal points.

Once the multidimensional space is constructed and the different zones are defined, the following steps (see FIG. 1) are performed for each charging time for the signal from the soot sensor:

generation of the residue (RES),
determination of the parameters (PAR),
incorporation in the multidimensional space (GRA),
classification (CLA), and
generation of an alarm signal (ALA).

Generation of the Residue

In the same way as for the generation of the multidimensional space, for each charging time of the signal from the soot sensor, an indicator is determined: the residue R (fault indicator) which is computed from the soot sensor signal during the charging time and which can correspond to the charging time or any function of the data accumulated from the sensor during the charging like the integral, the average value, the average slope of the signal from the sensor.

Determination of the Parameters

For each charging time of the soot sensor, the values of the parameters defined for the multidimensional space are determined as a function of the quantities measured during the charging time.

Incorporation in the Multidimensional Space

The data determined previously (residue and parameters) make it possible to generate a point in the multidimensional space.

This point can be projected into a reference frame corresponding to the multidimensional space, such as the reference frame illustrated in FIG. 3.

Classification

During this step, a point P of coordinates ($x_p, y_p, z_p$ in the 3D case) placed in the multidimensional space and not forming part of the learning data, is assigned to the nominal class or to the failing class as a function of its position in the multidimensional space, if appropriate as a function of its position relative to the different defined zones. It will be noted that the point P to be classified is constructed from the sensor signal and from the engine data taken with a filter whose state is unknown for the diagnostic algorithm and which can be nominal or failing.

In the case where at least two zones Z1 and Z2 have been defined, the filter is considered nominal if the point P is assigned to the nominal zone (Z2) and failing if the point P is assigned to the failing zone (Z1).

The point P is assigned to the nominal class if the coordinates ($x_p, y_p, z_p$) bear out the conditions of belonging to the second zone Z2. In this case, the filter corresponding to this point is considered as nominal.

The point P is assigned to the failing class if the coordinates ($x_p, y_p, z_p$) bear out the conditions of belonging to the first zone Z1. In this case, the filter corresponding to this point is considered as failing.

According to the embodiment in which a third zone Z3, called zone of ambiguity, is defined, a point P is classified in this third zone Z3 according to a criterion of neighborhood relative to the nominal and failing points in proximity to the point P. An example of neighborhood criterion is given in the following approach for the three-dimensional case:

a neighborhood VP of the point P($x_p, y_p, z_p$) is defined by a sphere of centre P and of radius $R_v$ defined as follows:

$$(x-x_p)^2+(y-y_p)^2+(z-z_p)^2=R_v^2$$

$R_v$ is an adjustable predetermined parameter which is used for the calibration of the diagnostic algorithm.

The number $N_{nom}$ of points (x,y,z) forming part of the set of nominal points and which are within this neighborhood is counted:

$N_{nom}$: number of nominal (x,y,z) such that $(x-x_p)^2+(y-y_p)^2+(z-z_p)^2<R_v^2$ The number $N_{def}$ of points (x,y,z) forming part of the set of failing points within this neighborhood is counted:

$N_{def}$: number of failing (x,y,z) such that $(x-x_p)^2+(y-y_p)^2+(z-z_p)^2<R_v^2$ The assignment of the point P to one of the two classes is done as follows:

P is considered as a failing point if $N_{def}-N_{nom}>S_v$, the corresponding filter is then considered as failing P is considered as a nominal point if $N_{def}-N_{nom} \leq S_v$, the corresponding filter is then considered as nominal.

Figure 4:
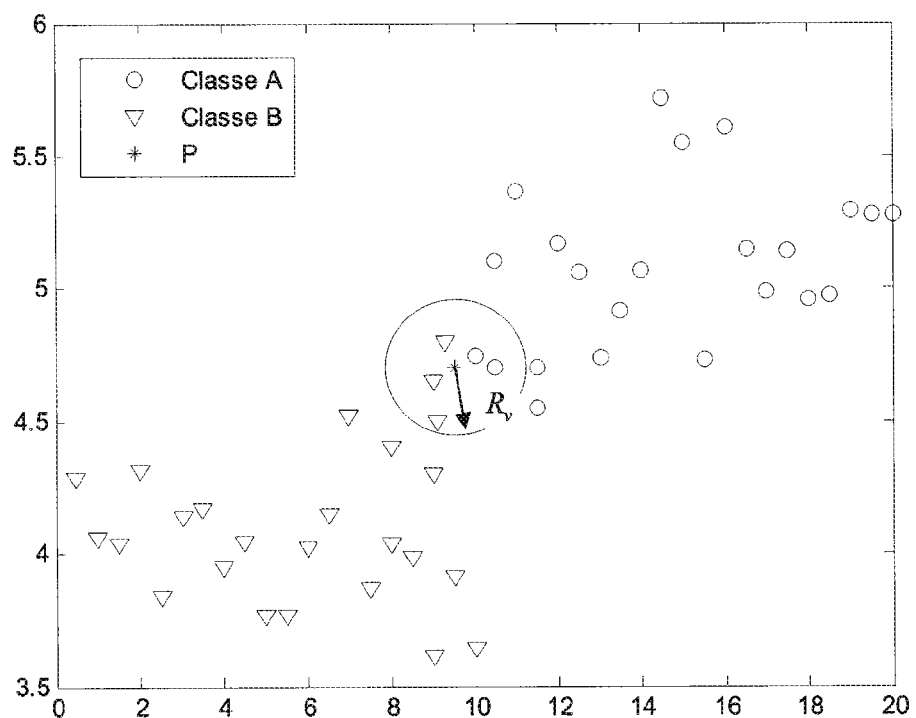
FIG. 4 represents an illustrative example for the application of the neighborhood criterion.

$S_v$ is an adjustable threshold which is used for the calibration of the diagnostic algorithm. FIG. 4 illustrates an exemplary neighborhood criterion in the two-dimensional case. In the circle of centre P and of radius $R_v$, two points of class A and three points of class B are counted. If it is considered that the class B is the failing class $N_{def}-N_{nom}=1$, therefore if the threshold $S_v$ is set at a negative or zero value, the point P is considered as failing and if the threshold $S_v$ is set at a value greater than or equal to 1, the point P is considered as nominal.

$R_v$ and $S_v$ are two predetermined calibration parameters. They are determined as a function of predetermined objectives of non-detection of failure and false alarms. Advantageously, the threshold $S_v$ can lie between 0 and 5. A high value of the threshold $S_v$ corresponds to a weighting of the false alarms, the method is then robust relative to the false alarms to the cost of non-detections.

Generation of an Alarm Signal

An alarm signal is generated by the diagnostic method, when one or more measured points are considered as failing. This alarm signal can make it possible to warn the user of the vehicle of the state of the particulate filter, it can also make it possible to alert the control unit of the engine of a failure in order to adapt the control of the engine to the state of the particulate filter. Advantageously, the number of failures $P_{def}$ to be detected (successive failures or failures over a time period set beforehand) before generating the alarm signal provides an additional degree of freedom to achieve the predetermined objectives of non-detection of failure and of false alarms. According to one embodiment, the number of failures $P_{def}$ can be modulated as a function of the belonging of the point to the zones Z1, Z2 or Z3. This alarm signal can be a binary signal. It can make it possible to illuminate a lamp on the dashboard of the vehicle equipped with the diesel engine.

If an alarm signal is generated, then the particulate filter can be replaced.

The method according to the invention is applicable in the field of vehicles, notably motor vehicles.

Contrary to alternative methods which require a model of the filter, a model of the sensor and/or an engine output soot estimator, which demands a lot of calibrations and complicates the particulate filter diagnostic task because of the different dispersions (models and estimator), the method proposed here uses neither soot estimator, nor component models (sensor and filter) and is based on the direct analysis of the temporal signal supplied by the soot sensor and the use of available measured quantities.

The projection of the residue into a reference frame linked to the operating conditions, makes the diagnosis by this method robust to changes of running cycles, which allows it to be applied for running OBD (on-board diagnostic) type approval tests and for the on-board diagnosis of the particulate filter during the actual life of the vehicle.

The diagnostic method according to the invention is simple to implement, it is based on basic mathematical operations which do not demand a lot of computation time, which allows it to be directly incorporated in a microcontroller linked to the sensor or for it to be implemented in the control unit of the vehicle.

The diagnostic method according to the invention is easy to calibrate: only three parameters ($R_v$ and $S_v$ and $P_{def}$) are necessary to calibrate the diagnostic algorithm once the desired false alarm and non-detection rates are defined. In effect, the definition of the zones Z1 and Z2 is done at the end of the learning phase and is not called into question when choosing the two parameters $R_v$ and $S_v$.

Illustrative Example

This part shows an example of use of the method according to the invention illustrating the different steps described previously. The simulation data generated with a nominal filter and a failing filter for six different running cycles are used for this example. Gaussian dispersions have been added to the soot upstream of the filter and to the sensor signal.

In this example, the residue chosen corresponds to the charging time, the parameters $F_1$ and $F_2$ correspond to the integrals of the torque demand and of the engine speed during the charging time.

A nominal class is made up with points corresponding to the data generated with the nominal filter and a failing class is made up with points corresponding to the data generated with the failing filter.

Figure 5:
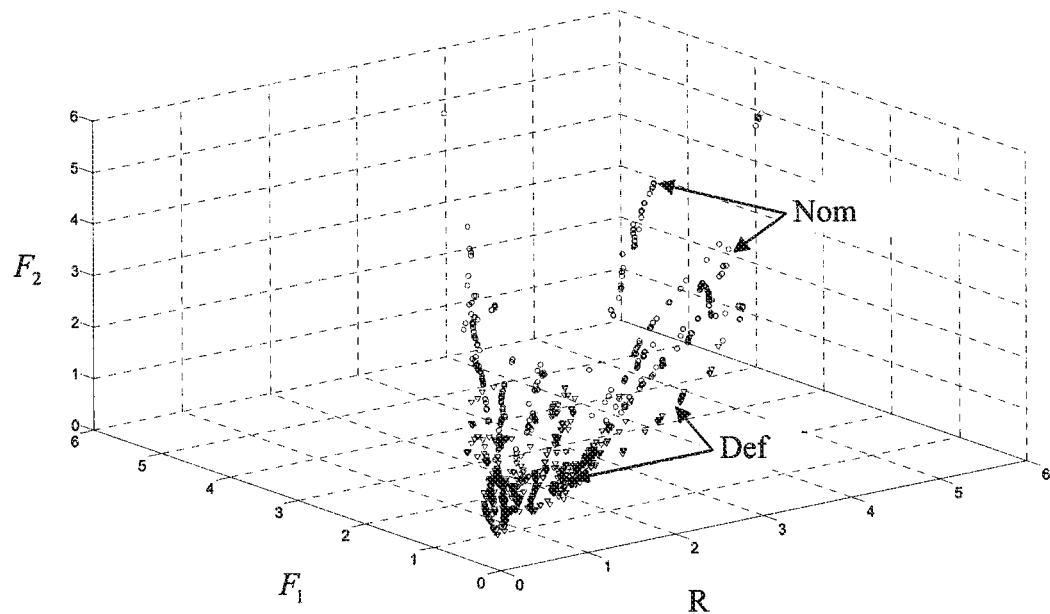
FIG. 5 is a representation of a three-dimensional space for an example according to the invention.

FIG. 5 shows the two nominal and failing classes in a 3D reference frame linking the residue to the operating conditions (torque demand, engine speed).

Two discriminable zones Z1 and Z2 are defined by limit thresholds such that there are only points of the nominal class which bear out the threshold of Z2 and only failing points which bear out the threshold of Z1.

Z2 corresponds to the zone of the 3D space bearing out the following constraint:

$$x+y+z>7.7$$

Z1 corresponds to the zone of the 3D space bearing out the following constraint:

$$x+y+z<3.7$$

A zone of ambiguity Z3 is formed by the nominal and failing points which do not bear out the criteria of belonging to the discriminable zones given above.

Figure 6:
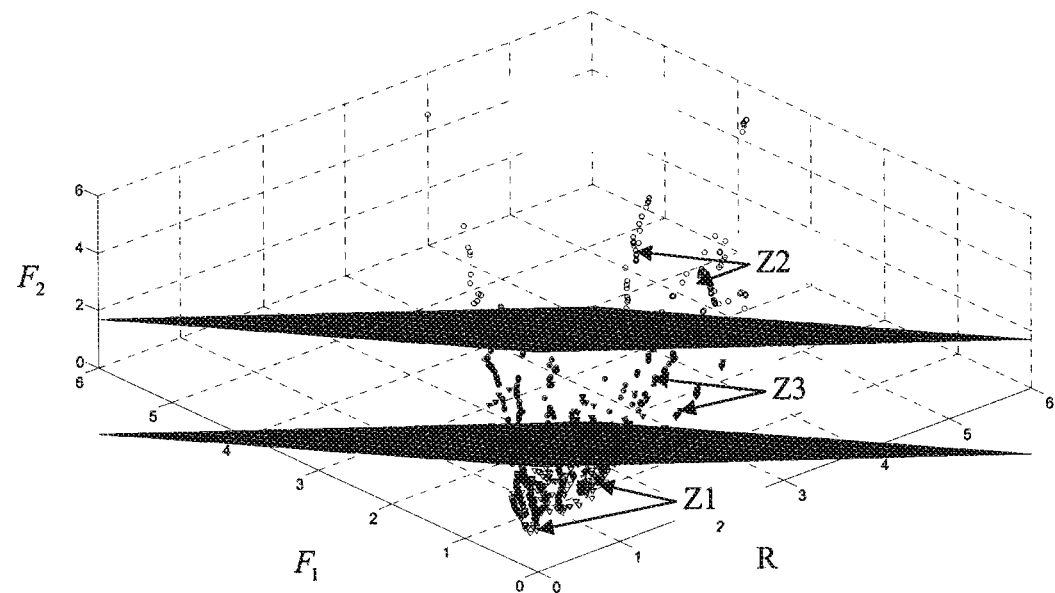
FIG. 6 corresponds to the representation of FIG. 5, to which has been added the definition of the first, second and third zones.

FIG. 6 shows the zones Z1, Z2 and Z3.

Figure 7:
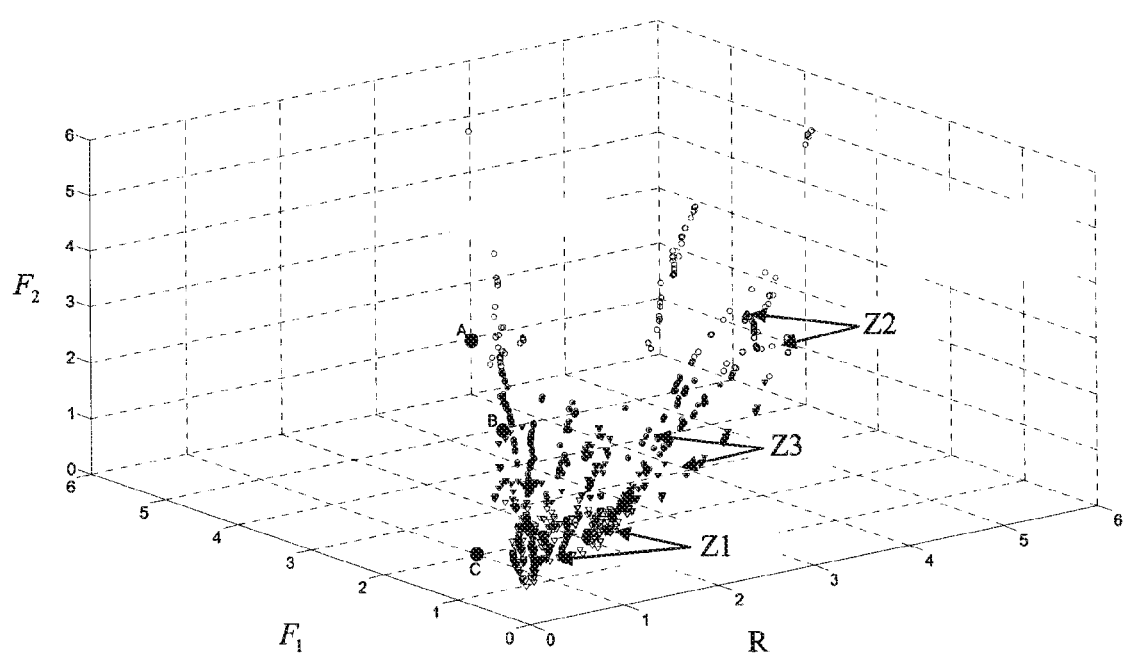
FIG. 7 corresponds to the representation of FIG. 5, on which have been placed three points to be diagnosed.

The procedure of assignment of a new point to a class in the three cases is illustrated using three points A (4, 6, 1), B(1.3, 2.1, 2.1) and C(1, 2, 0) of FIG. 7:

Point A is assigned to the nominal class because it bears out the condition of Z2: $x_A+y_A+z_A=11>7.7$.

The point B does not bear out the conditions of belonging to the discriminable zones Z1 and Z2, it is the rule of neighborhood relative to the nominal and failing points of the zone of ambiguity which is applied. By taking for example a neighborhood of B of radius $R_v=0.45$, four failing points and three nominal points are located in this neighborhood ($N_{def}=4$ and $N_{nom}=3$). Consequently, the point B is assigned to the nominal class if $S_v \geq 1$, otherwise it is assigned to the failing class. For example, for $S_v=0$, the point B is considered failing and for $S_v=1$, the point B is considered nominal.

The point C is assigned to the failing class because it bears out the condition of Z1:

$$x_C+y_C+z_C=3<3.7.$$

The invention claimed is:

1. A method for diagnosing a particulate filter incorporated in an exhaust circuit of a heat engine, in which a signal is acquired from a soot sensor arranged downstream of said particulate filter, said signal from the sensor being made up of a plurality of charging times of said soot sensor corresponding to the soot build-up time until the regeneration of said soot sensor, characterized in that:
   a multidimensional space is constructed of which one dimension corresponds to an indicator determined by means of said sensor signal and of which the other dimensions correspond to at least one parameter linked to the operating conditions of said engine;
   then, at each end of charging of said soot sensor:
   a value of said indicator is determined by means of said signal from the sensor;
   the values of said parameters are determined;
   the position of a point in said multidimensional space is determined by means of the values of said indicator and of said parameters; and
   the diagnosis of the state of said particulate filter is produced as a function of the position of said point in said multidimensional space.

2. The method as claimed in claim 1, in which, from learning data, at least one first zone is defined comprising only points corresponding to a failure of said particulate filter, and a second zone is defined comprising only points corresponding to a nominal operation of said particulate filter, and the diagnosis of said particulate filter is produced as a function of the position of said point relative to said zones.

3. The method as claimed in claim 2, in which a failure of said particulate filter is diagnosed when said point belongs to said first zone.

4. The method as claimed in claim 2, in which, in said multidimensional space, a third zone is defined that is distinct from said first and second zones, said third zone comprising points corresponding to a nominal operation of said particulate filter and points corresponding to a failure of said particulate filter, for a point situated in said third zone, a failure of said particulate filter is diagnosed when the difference between the number of points corresponding to a failure and the number of points corresponding to a nominal operation arranged at a distance less than $R_v$ from said point to be analyzed is greater than a predetermined threshold $S_v$.

5. The method as claimed in claim 1, in which at least one of the user and the control unit of said engine are alerted when at least one failure of said particulate filter is diagnosed.

6. The method as claimed in claim 1, in which said indicator corresponds to the charging time of said signal from said soot sensor or to the integral, the average value, the average slope of said signal from the soot sensor during said charging time.

7. The method as claimed in claim 1, in which said parameters are a function of the quantities measured for the control of said engine.

8. The method as claimed in claim 7, in which said measured quantities are chosen from the torque demand, the engine speed, the air flow rate, the intake pressure and the exhaust pressure.

9. The method as claimed in claim 1, in which the multidimensional space is three-dimensional and the parameters are the integrals of the torque demand and of the speed of said engine.

10. The method as claimed in claim 1 in which said particulate filter is changed when at least one failure of said particulate filter is diagnosed.

\* \* \* \* \*